United States Patent [19]

Okano

[11] Patent Number: 5,777,447
[45] Date of Patent: Jul. 7, 1998

[54] CONTROL APPARATUS FOR BRUSHLESS DC MOTOR

[75] Inventor: Yoshiyuki Okano, Chiryu, Japan

[73] Assignee: Nippondenso Co., Ltd., Kariya, Japan

[21] Appl. No.: 646,046

[22] Filed: May 7, 1996

[30] Foreign Application Priority Data

May 29, 1995 [JP] Japan .................. 7-130443

[51] Int. Cl.⁶ .................................... H02K 17/32
[52] U.S. Cl. .................. 318/434; 318/254; 318/439; 318/432
[58] Field of Search ................. 318/139, 138, 318/254, 432, 434

[56] References Cited

U.S. PATENT DOCUMENTS

| | | | |
|---|---|---|---|
| 4,602,199 | 7/1986 | Walker | 318/798 |
| 4,751,438 | 6/1988 | Markunas | 318/254 |
| 4,835,448 | 5/1989 | Dishner et al. | |
| 4,908,556 | 3/1990 | Daggett et al. | 318/568.22 |
| 5,029,263 | 7/1991 | Rozman | 318/254 |
| 5,384,527 | 1/1995 | Rozman et al. | 318/254 |
| 5,420,492 | 5/1995 | Sood et al. | 318/254 |
| 5,430,362 | 7/1995 | Carr et al. | 318/139 |
| 5,444,349 | 8/1995 | Rozman et al. | 318/254 |

FOREIGN PATENT DOCUMENTS

4-255483   9/1992   Japan .
5-211796   8/1993   Japan .

*Primary Examiner*—David S. Martin
*Attorney, Agent, or Firm*—Cushman Darby & Cushman IP Group of Pillsbury Madison & Sutro, LLP

[57] ABSTRACT

A torque command value is calculated in response to a command. A torque current is calculated on the basis of the calculated torque command value. The torque current is to be driven through an armature winding of the brushless DC motor, and is in phase with an electrical angle of the brushless DC motor. Calculation is made as to a phase advance current to be driven through the motor armature winding. The phase advance current has a phase advance of 90° with respect to the motor electrical angle. A target current is calculated from the calculated torque current and the calculated phase advance current. An actual current through the motor armature winding is controlled in response to the calculated target current. An upper limit of the phase advance current is calculated on the basis of at least one of a speed command and a rotational speed of the brushless DC motor. A determination is made as to whether or not the actual current through the motor armature winding follows the target current. When the actual current through the motor armature winding follows the target current, the phase advance current is decreased within a range having a lower limit equal to zero. When the actual current through the motor armature winding does not follow the target current, the phase advance current is increased within a range having an upper limit equal to the calculated upper limit.

6 Claims, 6 Drawing Sheets

CONTROL APPARATUS FOR BRUSHLESS DC MOTOR

BACKGROUND OF THE INVENTION

1. Field of the Invention

This invention generally relates to a control apparatus for a brushless DC motor. This invention particularly relates to a control apparatus for a brushless DC motor which feeds a current of a 90° phase advance from an electrical angle to each motor armature winding to provide a wide controllable range of rotational motor speed. The control apparatus of this invention is usable in, for example, a high-speed spindle-driving motor system attached to a robot or an AC servo motor system for driving a robot joint.

2. Description of the Prior Art

In a prior-art drive apparatus for a three-phase brushless DC motor, a DC voltage is generated by full-wave rectification of AC electric power, and the generated DC voltage is fed to an inverter. Three-phase AC currents are generated from the DC voltage by the inverter, and the generated three-phase AC currents are fed to motor armature windings of different phases respectively. The prior-art drive apparatus has a control section in which a sensor such as an encoder detects the rotational position and the rotational speed of the brushless DC motor. A torque command value for controlling the motor in response to an externally-applied input command (for example, a speed command) is calculated on the basis of the detected rotational position, the detected rotational speed, and the input command. The three-phase AC currents fed to the motor armature windings from the inverter are controlled in response to the calculated torque command value.

It is known from a model based on d-q conversion that, under steady operating conditions of a brushless DC motor, a voltage and a current are given as follows.

$$Vd = Ke \cdot \omega m + R \cdot id - \omega m \cdot L \cdot iq \quad (1)$$

$$Vq = R \cdot iq + \omega m \cdot L \cdot id \quad (2)$$

where "id" denotes a d-axis current component (referred to as a torque current hereinafter); "iq" denotes a q-axis current component (having a 90° phase advance with respect to the d-axis, and referred to as a phase advance current hereinafter); "Vd" denotes a d-axis voltage component; "Vq" denotes a q-axis voltage component (having a 90° phase advance with respect to the d-axis); "R" denotes an armature resistance; "L" denotes an armature inductance; "Ke" denotes an induced voltage coefficient; and "ωm" denotes angular velocity (rotational speed).

In the case where a permanent magnet in the brushless DC motor is oriented along the q-axis, a motor terminal voltage "Va" (the resultant of the voltage "Vd" and the voltage "Vq") is limited as follows.

$$Va^2 = (Ke \cdot \omega m + R \cdot id - \omega m \cdot L \cdot iq)^2 + (R \cdot iq + \omega m \cdot L \cdot id)^2 \leq Vmax^2 \quad (3)$$

where "Vmax" denotes a maximum voltage applied to the brushless DC motor.

As the brushless DC motor is operated at a higher speed, the angular velocity "ωm" increases. According to the designing of the brushless DC motor, the armature resistance "R" is made as small as possible. Therefore, in the case where the phase advance current "iq" is set great, a large margin of the motor terminal voltage "Va" with respect to the maximum voltage "Vmax" is available in a high-speed operation range. Thus, it is possible to provide a wider range of a motor voltage in which the related motor current can be controlled. This enables higher speed and greater torque output of the brushless DC motor.

During rotation of the brushless DC motor, the voltage "Ke·ωm" induced across a motor armature winding increases in proportion to the rotational speed of the motor. The rotational speed of the motor is inhibited from further increasing when the induced voltage "Ke·ωm" reaches and exceeds the maximum voltage "Vmax" applied from the inverter. Accordingly, in the case where the brushless DC motor is driven by only the torque current "id" in phase with the motor electrical angle during high-speed operation of the motor, the motor terminal voltage "Va" easily reaches and exceeds the maximum voltage "Vmax" so that speed control of the motor tends to be difficult. On the other hand, in the case where the phase advance current "iq" which has a 90° phase advance from the motor electrical angle is also fed to the motor, the motor terminal voltage "Va" is reduced so that suitable speed control of the motor is available.

In a prior-art system for controlling and driving a brushless DC motor, a phase advance current is set in response to a speed command or the actual rotational speed of the motor. According to such a prior-art control system, a phase advance current always flows through the motor during high-speed operation thereof. Thus, electric power tends to be wasted when the motor is operated in a given high-speed range where a torque output is not so required. The waste of electric power causes the generation of heat.

Japanese published unexamined patent application 5-211796 discloses a method and an apparatus for driving a brushless DC motor in which a speed command and an actual rotational speed are compared with each other. When the speed command is greater than the actual rotational speed, a phase advance current is increased. When the speed command is smaller than the actual rotational speed, the phase advance current is decreased. Thus, the phase advance current is updated time to time. Japanese application 5-211796 also discloses that the upper side of the phase advance current is limited on the basis of an input current into a converter for implementing the full-wave rectification of AC electric power, and that the phase advance current is made to flow only when a torque output is required.

In the method and apparatus of Japanese application 5-211796, the upper side of the phase advance current is limited on the basis of the input current into the converter. Accordingly, the method and apparatus of Japanese application 5-211796 can be applied to a system in which only one inverter (one motor) is connected to one converter. However, the method and apparatus of Japanese application 5-211796 can not be applied to a system in which a plurality of inverters are connected to one converter. An example of such a plural-inverter system is a multiple-axis control system equipped with a plurality of motors for driving a robot. The method and apparatus of Japanese application 5-211796 require a circuit for detecting the input current into the converter.

In Japanese application 5-211796, the rotational speed results from the drive and control of the motor in response to the speed command, and the rotational speed has a response time lag with respect to the speed command. Accordingly, the phase advance current, which is set in response to the speed command and the rotational speed, has a corresponding response time lag. Thus, it is difficult to promptly update the phase advance current in accordance with a necessary torque output.

In Japanese application 5-211796, when the speed command is constant (that is, when the motor is operated at a constant speed), the phase advance current can be converged into an optimal level matching with a necessary torque output. On the other hand, in the case where the speed command continues to be increased, for example, in the case where the motor continues to be accelerated, the phase advance current is corrected and continuously increased. Thus, in such a case, the phase advance current tends to be excessively great with respect to a necessary torque output. The excessively great phase advance current causes a waste of electric power.

SUMMARY OF THE INVENTION

It is an object of this invention to provide an improved control apparatus for a brushless DC motor.

A first aspect of this invention provides a control apparatus for a brushless DC motor which comprises torque command value calculating means for calculating a torque command value to drive the brushless DC motor in response to a command torque current calculating means for calculating a torque current on the basis of the calculated torque command value, the torque current being to be driven through an armature winding of the brushless DC motor and being in phase with an electrical angle of the brushless DC motor. The control apparatus further includes phase advance current calculating means for calculating a phase advance current to be driven through the motor armature winding, the phase advance current having a phase advance of 90° with respect to the motor electrical angle and current controlling means for calculating a target current from the calculated torque current and the calculated phase advance current, and for controlling an actual current through the motor armature winding in response to the calculated target current. The phase advance current calculating means comprises upper limit calculating means for calculating an upper limit of the phase advance current on the basis of at least one of a speed command and a rotational speed of the brushless DC motor and means for detecting the actual current through the motor armature winding which is controlled by the current controlling means. The phase advance current calculating means further includes follow-up condition determining means for determining whether or not the detected actual current through the motor armature winding follows the target current and phase advance current updating means for, when the follow-up condition determining means determines that the detected actual current through the motor armature winding follows the target current, decreasing the phase advance current within a range having a lower limit equal to zero, and for, when the follow-up condition determining means determines that the detected actual current through the motor armature winding does not follow the target current, increasing the phase advance current within a range having an upper limit equal to the upper limit calculated by the upper limit calculating means.

A second aspect of this invention provides a control apparatus for a brushless DC motor which comprises torque command value calculating means for calculating a torque command value to drive the brushless DC motor in response to a command and torque current calculating means for calculating a torque current on the basis of the calculated torque command value, the torque current being to be driven through an armature winding of the brushless DC motor and being in phase with an electrical angle of the brushless DC motor. The control apparatus further includes phase advance current calculating means for calculating a phase advance current to be driven through the motor armature winding, the phase advance current having a phase advance of 90° with respect to the motor electrical angle and current controlling means for calculating a target current from the calculated torque current and the calculated phase advance current, and for controlling an actual current through the motor armature winding in response to the calculated target current wherein the phase advance current calculating means comprises c1) upper limit calculating means for calculating an upper limit of the phase advance current on the basis of at least one of a speed command and a rotational speed of the brushless DC motor and current value calculating means for increasing the phase advance current as said one of the speed command and the rotational speed increases and the torque command value increases. The phase advance current calculating means further includes means for outputting smaller one of the upper limit calculated by the upper limit calculating means and the phase advance current provided by the current value calculating means to the current controlling means as the phase advance current used by the current controlling means.

A third aspect of this invention is based on the first aspect thereof, and provides a control apparatus wherein the phase advance current calculating means further comprises decelerating operation determining means for determining whether or not the brushless DC motor is currently decelerated on the basis of a variation in one of the speed command and the rotational speed; and calculation inhibiting means for substantially nullifying the phase advance current to inhibit calculation of the phase advance current when the decelerating operation determining means determines that the brushless DC motor is currently decelerated.

A fourth aspect of this invention is based on the second aspect thereof, and provides a control apparatus wherein the phase advance current calculating means further comprises decelerating operation determining means for determining whether or not the brushless DC motor is currently decelerated on the basis of a variation in one of the speed command and the rotational speed; and calculation inhibiting means for substantially nullifying the phase advance current to inhibit calculation of the phase advance current when the decelerating operation determining means determines that the brushless DC motor is currently decelerated.

A fifth aspect of this invention is based on the first aspect thereof, and provides a control apparatus wherein the phase advance current calculating means further comprises high-speed drive determining means for determining whether or not the brushless DC motor is currently driven at a rotational speed higher than a given rotational speed; and means for substantially nullifying the phase advance current when the high-speed drive determining means determines that the brushless DC motor is not currently driven at a rotational speed higher than the given rotational speed.

A sixth aspect of this invention is based on the first aspect thereof, and provides a control apparatus wherein the upper limit calculating means comprises a map for calculating the upper limit, the map having a maximum phase advance current value predetermined with respect to the speed command, and means for calculating the upper limit of the phase advance current by referring to the map.

DESCRIPTION OF THE PREFERRED EMBODIMENTS

First Embodiment

Figure 1:
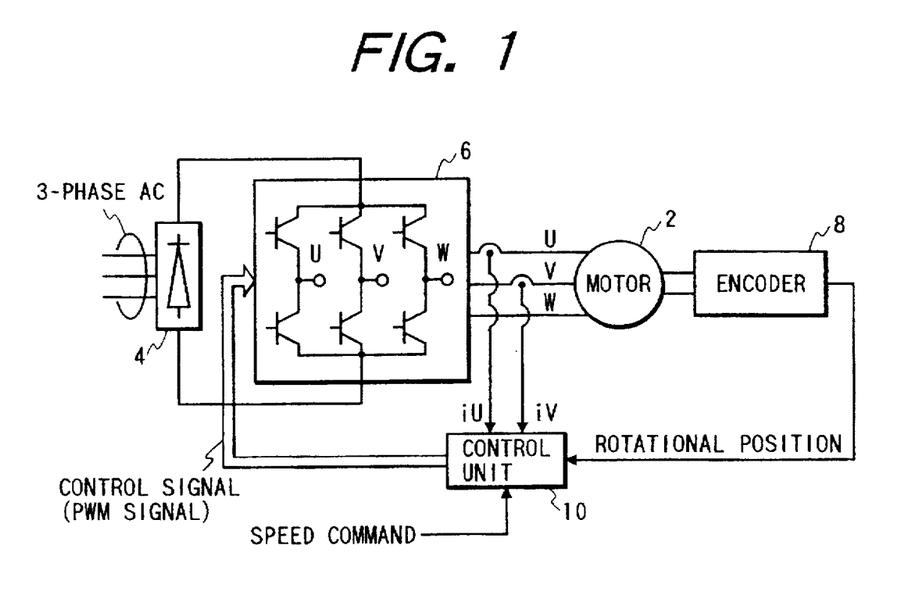
FIG. 1 is a diagram of a control apparatus for a brushless DC motor according to a first embodiment of this invention.

With reference to FIG. 1, a control apparatus for a brushless DC motor 2 includes a converter 4, an inverter 6, an encoder 8, and a control unit 10. The brushless DC motor 2 has armature windings of three different phases "U", "V", and "W" respectively. The converter 4 implements the full-wave rectification of AC electric power, thereby converting the AC electric power into DC electric power. The inverter 6 receives the DC electric power from the converter 4. The inverter 6 energizes the motor armature windings of the respective phases "U", "V", and "W" in response to control signals fed from the control unit 10. Each of the control signals has a form equal to that of a pulse-width modulation signal (a PWM signal). Specifically, the inverter 6 generates three-phase drive currents "iU", "iV", and "iW" from the DC electric power in response to the control signals, and feeds the generated three-phase drive currents "iU", "iV", and "iW" to the motor armature windings of the phases "U", "V", and "W" respectively. The encoder 8 serves as a sensor or a detecting means for generating a detection signal representing the rotational position (the angular position) of the output shaft of the motor 2. The control unit 10 receives the detection signal from the encoder 8. The control unit 10 is informed of the values of the drive currents "iU" and "iV" fed to the motor armature windings of the phases "U" and "V" respectively. In addition, the control unit 10 receives a signal of a speed command from an external device (not shown). The control signal 10 generates the inverter control signals in response to the detection signal, the values of the drive currents "iU" and "iV", and the speed command.

The control unit 10 includes a microcomputer having a combination of a CPU, a ROM, a RAM, and an input/output port (an interface). The control unit 10 operates in accordance with a program stored in the ROM.

Figure 2:
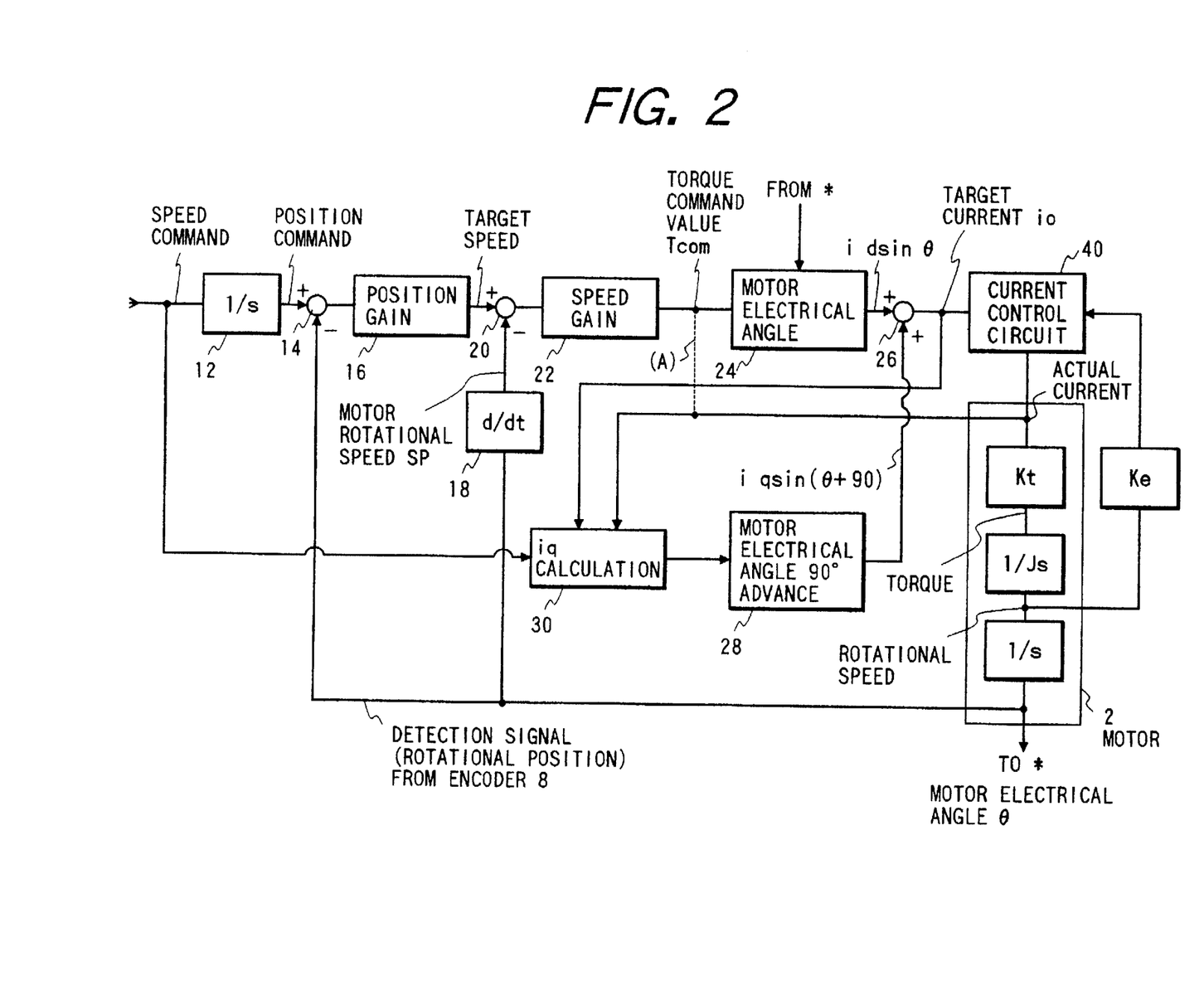
FIG. 2 is a function flow diagram of a control unit, a brushless DC motor 2, and other portions of the control apparatus in FIG. 1.

FIG. 2 is a function flow diagram of the control unit 10, the motor 2, and other portions of the control apparatus in FIG. 1. With reference to FIG. 2, the function of the control unit 10 includes an integral processing section 12 which integrates the externally-applied speed command into a position command. The integration implemented by the integral processing section 12 is expressed as "1/s". A difference calculating section 14 is informed of the position command. The difference calculating section 14 receives the detection signal from the encoder 8 which represents the rotational position (the angular position). The section 14 calculates the difference (the positional difference) between the position command and the rotational position. A target speed calculating section 16 is informed of the calculated positional difference. The target speed calculating section 16 multiplies the positional difference by a given positional gain, thereby calculating a target rotational speed of the motor 2.

The function of the control unit 10 includes a differential processing section 18. The differential processing section 18 receives the detection signal from the encoder 8 which represents the rotational position (the angular position). The differential processing section 18 differentiates the detection signal, thereby calculating an actual rotational speed of the motor 2. The differentiation implemented by the differential processing section 18 is expressed as "d/dt". A difference calculating section 20 is informed of the target rotational speed calculated by the target speed calculating section 16. Also, the difference calculating section 20 is informed of the actual rotational speed calculated by the differential processing section 18. The section 20 calculates the difference (the speed difference) between the target rotational speed and the actual rotational speed. A torque command value calculating section 22 is informed of the calculated speed difference. The torque command value calculating section 22 multiplies the speed difference by a given speed gain, thereby calculating a torque command value "Tcom". A torque current calculating section 24 is informed of the calculated torque command value "Tcom". The torque current calculating section 24 receives information of a motor electrical angle "θ" from the encoder 8. The torque current calculating section 24 multiplies the torque command value by a coefficient corresponding to the motor electrical angle "θ", thereby calculating a torque current "id·sinθ" to be driven through each of the motor armature windings of the phases "U" and "V".

The function of the control unit 10 includes an iq calculating section 30 for calculating a command value "iq", that is, a value related to a current (a phase advance current) having a phase which advances from the motor electrical angle "θ" by 90° in connection with each of the motor armature windings of the phases "U" and "V". A phase current converting section 28 is informed of the calculated command value "iq" of the phase advance current. The phase current converting section 28 multiplies the command value "iq" by a coefficient corresponding to an electrical angle "θ+90" equal to the sum of the motor electrical angle "θ" and the phase advance angle "90°", thereby calculating a phase advance current "iq·sin(θ+90)" to be driven through each of the motor armature windings of the phases "U" and "V".

The torque current calculating section 24 multiplies the command value "id" of the torque current by the coefficient "sinθ" responsive to the motor electrical angle "θ" as a parameter, thereby calculating the torque current "id·sinθ" to be driven through each of the motor armature windings of the phases "U" and "V". It should be noted that the command value "id" of the torque current corresponds to the torque command value. As previously described, the phase current converting section 28 multiplies the command value "iq" of the phase advance current by the coefficient "sin(θ+90)" responsive to the motor electrical angle "θ" as a parameter, thereby calculating the phase advance current "iq·sin(θ+90)" to be driven through each of the motor armature windings of the phases "U" and "V". The motor electrical angle "θ" used by the torque current calculating section 24 and the phase current converting section 28 is derived from the detection signal outputted by the encoder 8. In the case of a brushless DC motor where the "V" phase retards from the "U" phase by 120°, the electrical angle of the "V" phase is given as "(θ−120)" when the electrical angle of the "U" phase is denoted by "θ". In this case, the torque current of the "V" phase and the phase advance current of the "V" phase are expressed as "id·sin(θ−120)" and "iq·sin(θ−120+90)" respectively.

The function of the control unit 10 includes an adding section 26 informed of the torque currents and the phase advance currents of the phases "U" and "V" which are calculated by the torque current calculating section 24 and the phase current converting section 28. The section 26 adds the torque current of the phase "U" and the phase advance current of the phase "U". The result of the addition is set as a target current "iOU" to be driven through the motor armature winding of the phase "U". The section 26 adds the torque current of the phase "V" and the phase advance current of the phase "V". The result of the addition is set as a target current "iOV" to be driven through the motor armature winding of the phase "V".

The control unit 10 includes a current control circuit 40. The current control circuit 40 generates control signals (pulse-width modulation signals or PWM signals) for the inverter 6 so that actual currents flowing through the motor armature windings of the phases "U" and "V" will be substantially equal to the target currents "iOU" and "iOV" thereof respectively, and that an actual current flowing through the motor armature winding of the phase "W" will be substantially equal to a target current "iOW" thereof.

Figure 3:
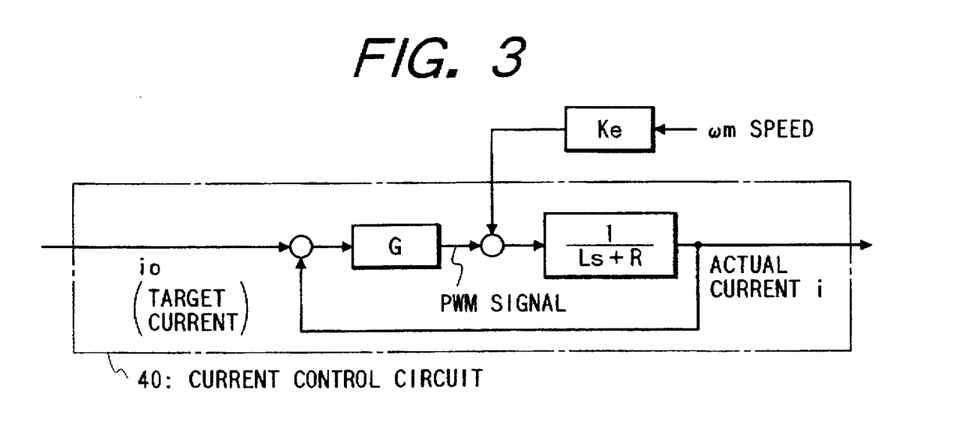
FIG. 3 is an operation flow diagram of a current control circuit in the control unit of FIG. 1.

With reference to FIG. 3, the operation of the current control circuit 40 will be described in more detail. The terminal voltage across each of the motor armature windings of the phases "U", "V", and "W" is equal to the resultant of an induced voltage "Ke·ωm" and a drive voltage outputted from the inverter 6 in response to the related control signal. The induced voltage is equal to the product of the angular velocity (the rotational speed) "ωm" of the motor 2 and the induced voltage coefficient "Ke" related to the motor armature winding. The actual current "i" flowing through each of the motor armature windings of the phases "U", "V", and "W" is equal to the related terminal voltage multiplied by a coefficient "1/(Ls+R)" responsive to parameters being the inductance "L" and the resistance "R" of the related motor armature winding. As shown in FIG. 3, for each of the motor armature windings of the phases "U" and "V", the current control circuit 40 calculates the difference (the current difference) between the actual current "i" and the target current "iO". In addition, the current control circuit 40 multiplies the calculated current difference by a predetermined current control gain "G", thereby generating a control signal (a pulse-width modulation signal or a PWM signal) for the inverter 6.

The current control circuit 40 is informed of the target currents "iOU" and "iOV" for the motor armature windings of the phases "U" and "V" respectively. The control unit 10 is informed of the actual currents "iU" and "iV" which flow through the motor armature windings of the phases "U" and "V" respectively. The current control circuit 40 generates a control signal for the motor armature winding of the phase "U" from the difference between the target current "iOU" and the actual current "iU". In addition, the current control circuit 40 generates a control signal for the motor armature winding of the phase "V" from the difference between the target current "iOV" and the actual current "iV". Further, the current control circuit 40 generates a control signal for the motor armature winding of the phase "W" from the control currents for the motor armature windings of the phases "U" and "V" by referring to the relation as "iU+iV+iW=0" where "iW" denotes the actual current flowing through the motor armature winding of the phase "W".

With reference back to FIG. 2, in the case where the motor armature currents of the phases "U", "V", and "W" are controlled as previously described, a rotator in the motor 2 is provided with a torque determined by the values of the motor armature currents and a torque constant "Kt". The torque causes an angular velocity (a rotational speed) of the output shaft of the motor 2. The angular velocity (the rotational speed) has a delay "1/Js" due to the inertia of the output shaft of the motor 2. The output shaft of the motor 2 is controlled at a rotational position (an angular position) which results from integrating ("1/s") the angular velocity (the rotational speed) thereof.

The torque current "id·sinθ" is in phase with the motor electrical angle "θ". On the other hand, the phase advance current "iq·sin(θ+90)" has a phase advance of 90° with respect to the motor electrical angle "θ". The sum of the torque current "id·sinθ" and the phase advance current "iq·sin(θ+90)" is set as the target current "iO" to be driven through each of the motor armature windings of the phases "U", "V", and "W". The actual currents flowing through the motor armature windings of the phases "U", "V", and "W" are controlled so as to be substantially equal to the target currents "iOU", "iOV", and "iOW" respectively.

Figure 4:
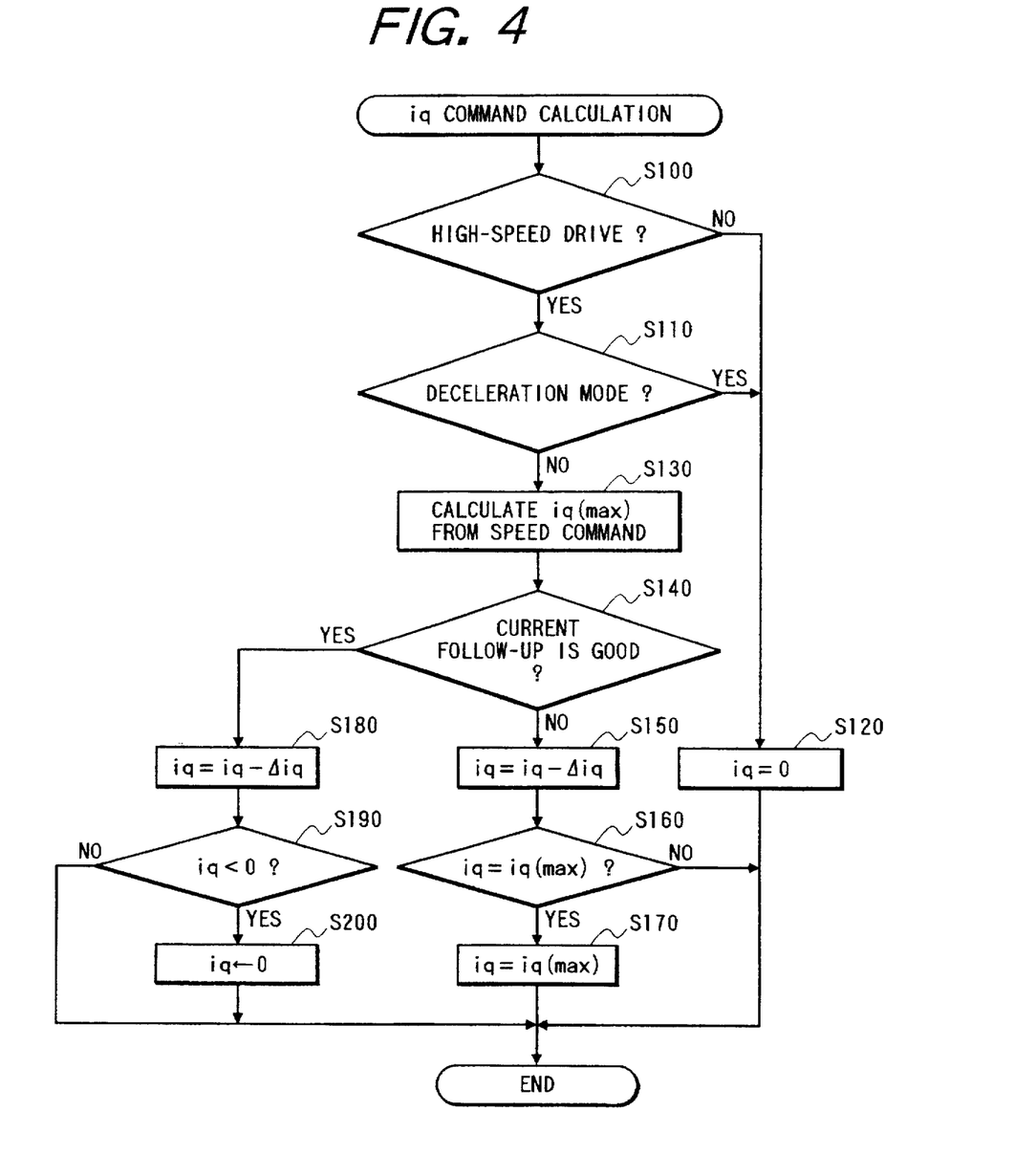
FIG. 4 is a flowchart of a segment of a program related to the control unit in FIG. 1.

As previously described, the control unit 10 operates in accordance with a program stored in the internal ROM. FIG. 4 is a flowchart of a segment of the program which relates to the iq calculating section 30 in FIG. 2. The program segment in FIG. 4 is reiterated at a given control period of, for example, 0.5 msec, together with other calculating processes for the drive and the control of the motor 2. In respect of each of the motor armature windings of the phases "U" and "V", the iq calculating section 30 calculates the command value "iq" of the phase advance current from the speed command, the target current "iO", and the actual current "i".

As shown in FIG. 4, a first step S100 of the program segment determines whether or not given conditions are currently present in which the motor 2 should be driven at a rotational speed higher than a given rotational speed by referring to the speed command. When the given conditions are not currently present, a phase advance current does not need to be driven through the related motor armature winding so that the program advances from the step S100 to a step S120. The step S120 sets a command value "iq" of a phase advance current to "0". After the step S120, the present execution cycle of the program segment ends.

When the step S100 finds the given conditions to be currently present, the program advances from the step S100 to a step S110. The step S110 derives a condition of a variation in the speed command. By referring to the derived condition of the variation in the speed command, the step S110 determines whether or not the present operation mode of the motor 2 is equal to a decelerating operation mode in which the motor 2 should be decelerated. When the present operation mode of the motor 2 is equal to the decelerating operation mode, the program advances from the step S110 to the step S120. On the other hand, when the present operation mode of the motor 2 is equal to other operation modes, the program advances from the step S110 to a step S130. Examples of the other operation modes are a constant-speed operation mode in which the motor 2 should be operated at a constant speed, and an accelerating operation mode in which the motor 2 should be accelerated. As previously described, the step S120 sets the command value "iq" of the phase advance current to "0". After the step S120, the present execution cycle of the program segment ends. The step S130 calculates an upper limit "iq(max)" of the command value "iq" of the phase advance current on the basis of the speed command. The step S130 may calculate an upper limit "iq(max)" of the command value "iq" of the phase advance current on the basis of the rotational speed derived from the output signal of the encoder 8.

Figure 5:
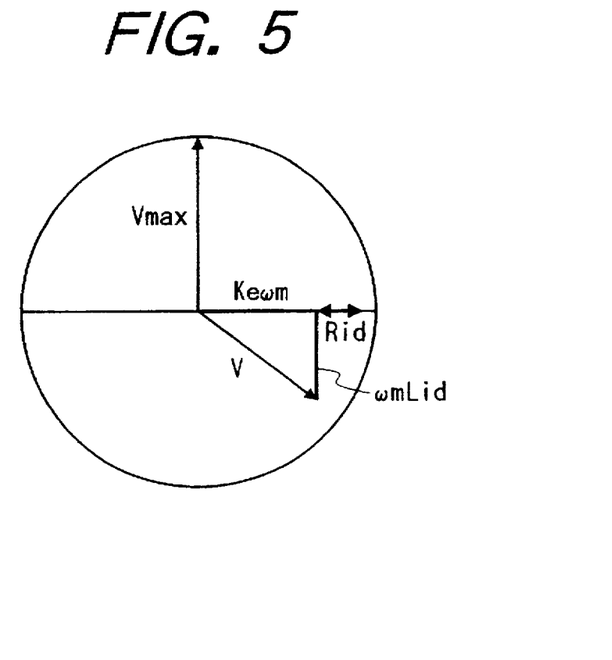
FIG. 5 is a diagram of a voltage vector which occurs during deceleration of a brushless DC motor.

The command value "iq" of the phase advance current is set to "0" not only in the case where the motor 2 should be driven at a high speed but also in the case where the step S110 finds the present operation mode of the motor 2 to be the decelerating operation mode. The reason for the execution of this process is as follows. During deceleration of the motor 2, it is sufficient to generate a negative torque in the motor 2. It is understood from FIG. 5 being a voltage vector view that, during deceleration of the motor 2, there is an increased margin of a terminal voltage "V" across the related motor armature winding with respect to the maximum voltage "Vmax", and any phase advance current does not need to be driven therethrough.

The step S130 executes the calculation of the upper limit "iq(max)" of the phase advance current by referring to an upper-limit calculating map provided in the ROM within the control unit 10. The upper-limit calculating map is previously set in accordance with a maximum necessary torque corresponding to the speed command, and with the following relation.

$$Va^2 = (Ke \cdot \omega m + R \cdot id - \omega m \cdot L \cdot iq)^2 + (R \cdot iq + \omega m \cdot L \cdot id)^2 \leq Vmax^2$$

Figure 9:
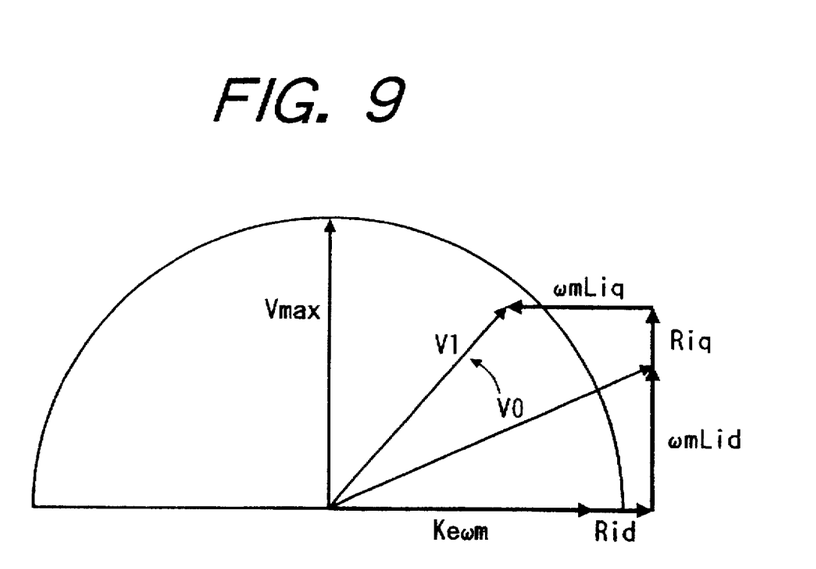
FIG. 9 is a diagram of a voltage vector which occurs during high-speed rotation of a brushless DC motor.

This relation is equal to the previously-indicated relation (3). During the rotation of the motor 2, the voltage "Ke·ωm" induced across a motor armature winding increases in proportion to the rotational speed of the motor 2. As understood from FIG. 9, if the motor 2 is driven at a high speed by only a torque current in phase with a motor electrical angle for each of the motor armature windings, a terminal voltage "V0" exceeds a maximum voltage "Vmax" and hence the motor 2 moves out of control. If a current "iq" having a phase advance of 90° from the motor electrical angle is also made to flow through the motor 2, the terminal voltage falls to a level "V1" lower than the maximum voltage "Vmax" so that the motor 2 is controllable.

Figure 6:
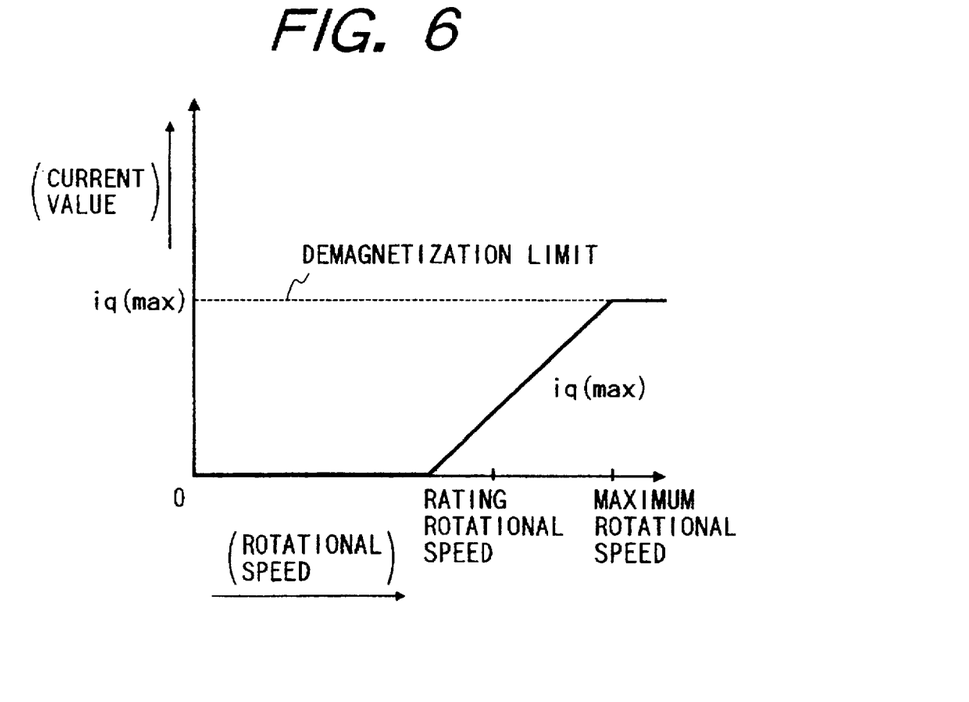
FIG. 6 is a diagram of a map for calculating an upper limit of a phase advance current.

FIG. 6 shows an example of the contents of the upper-limit calculating map used by the step S130. The upper-limit calculating map in FIG. 6 is determined by setting the maximum necessary torque corresponding to the rotational speed of the motor 2, and then implementing approximate calculation using the relation (3). Since a parameter in the upper-limit calculating map is the rotational speed, the speed command can be used in the calculation of the upper limit "iq(max)". The rotational speed of the motor 2 which is calculated by the differential processing section 18 in FIG. 2 may be used in the calculation of the upper limit "iq(max)". It should be noted that the differential processing section 18 calculates the rotational speed by differentiating the detection signal outputted from the encoder 8 which represents the rotational position (the angular position).

According to the upper-limit calculating map in FIG. 6, the upper limit "iq(max)" increases as the rotational speed of the motor 2 increases from a first given rotational speed. This increase in the upper limit "iq(max)" is based on the relation (3). The upper limit "iq(max)" remains constant as the rotational speed of the motor 2 reaches a second given rotational speed and then increases above the second given rotational speed. This constancy in the upper limit "iq(max)" is provided in consideration of the demagnetization characteristic of a permanent magnet in the motor 2. The constant upper limit "iq(max)" is chosen so that the phase advance current will not exceed a value corresponding to a demagnetization limit.

With reference back to FIG. 4, after the step S130 calculates the upper limit "iq(max)" of the phase advance current, the program advances to a step S140. The step S140 compares a target current "iO" and an actual current "i" with each other. The target current "iO" is inputted into the current control circuit 40 in FIG. 2. The actual current "i" results from the current control. Specifically, the step S140 calculates the difference between the target current "iO" and the actual current "i". Then, the step S140 determines whether or not the calculated difference is smaller than a given value. According to this determination, the step S140 decides whether or not the actual current "i" suitably follows the target current "iO". In the control unit 10, the target current "iO" is updated for every control period. The actual current "i" is quickly responsive since a circuit related to the actual current "i" has a small time constant. Therefore, it is thought that the actual current "i" can approximately follow the target current "iO" in a time corresponding to one control period. For example, the actual current "i" can move into a range corresponding to 5% of the rating current. Accordingly, calculation is given of the difference between the actual current "i" available in the present control period and the target current "iO" available in the immediately-preceding control period. Then, the step S140 determines whether or not the calculated difference is within 5% of the rating current to decide whether or not the actual current "i" suitably follows the target current "iO".

The determination executed by the step S140 may use either the difference between the target current "iOU" and the actual current "iU" for the motor armature winding of the phase "U" or the difference between the target current "iOV" and the actual current "iV" for the motor armature winding of the phase "V". Alternatively, the determination executed by the step S140 may use both the difference between the target current "iOU" and the actual current "iU" for the motor armature winding of the phase "U" and the difference between the target current "iOV" and the actual current "iV" for the motor armature winding of the phase "V". In this case, the step S140 determines whether or not both the calculated differences are within 5% of the rating current.

In the case where the step S140 finds the difference "iO-i" between the target current "iO" and the actual current "i" to be not smaller than the given value, the step S140 decides that the actual current "i" does not suitably follow the target current "iO" and that the phase advance current is insufficient. In this case, the program advances from the step S140 to a step S150. The step S150 increments the command value "iq" of the phase advance current by a given value "Δiq". A step S160 subsequent to the step S150 determines whether or not the command value "iq" given by the step S150 exceeds the upper limit "iq(max)". When the command value "iq" does not exceed the upper limit "iq(max)", the program exits from the step S160 and then the present execution cycle of the program segment ends. Otherwise, the program advances from the step S160 to a step S170. The step S170 sets the command value "iq" equal to the upper limit "iq(max)". In this way, the command value "iq" is limited to within a range equal to or below the upper limit "iq(max)". After the step S170, the present execution cycle of the program segment ends.

In the case where the step S140 finds the difference "iO-i" between the target current "iO" and the actual current "i" to be smaller than the given value, the step S140 decides that the actual current "i" suitably follows the target current "iO" and that the phase advance current is excessively great. In this case, the program advances from the step S140 to a step S180. The step S180 decrements the command value "iq" of the phase advance current by the given value "Δiq". A step S190 subsequent to the step S180 determines whether or not the command value "iq" given by the step S150 is negative. When the command value "iq" is not negative, the program exits from the step S190 and then the present execution cycle of the program segment ends. Otherwise, the program advances from the step S190 to a step S200. The step S200 resets the command value "iq" to "0". In this way, the command value "iq" is limited to within a range equal to or greater than "0". After the step S200, the present execution cycle of the program segment ends.

As previously described, when the motor 2 is not driven at a high speed and when the operation mode of the motor 2 agrees with the decelerating operation mode, the command value "iq" of the phase advance current is set to "0" so that the feed of the phase advance current is inhibited. In the case where the motor 2 is driven at a high speed and the operation mode of the motor 2 is different from the decelerating operation mode, an effective command value "iq" of the phase advance current is set so that the feed of the phase advance current is executed. In this case, the command value "iq" is increased and decreased time to time in response to the follow-up condition of the actual current "i" with respect to the target current "iO". The upper side of the command value "iq" is limited. Specifically, the command value "iq" is provided with the upper limit "iq(max)" at which the maximum necessary torque set on the basis of the speed command is available.

Therefore, the command value "iq" of the phase advance current and the phase advance current "iq·sin(θ+90)" driven through each of the motor armature windings of the phases "U", "V", and "W" can be limited to small values which enable the motor 2 to be driven in response to the torque command value calculated by the torque command value calculating section 22. Thus, it is possible to reduce the electric power consumed during the drive of the motor 2. A current which is not necessary for the drive of the motor 2 is prevented from flowing through the motor 2. Thus, it is possible to prevent the motor 2 from being heated by the unnecessary current. As a result, it is possible to provide a long time of continuous operation of the motor 2 at a high speed and a great torque. In addition, it is possible to shorten a time of the suspension of operation of the motor 2 to cool the motor 2 which is executed after high-speed and great-torque operation of the motor 2.

As previously described, the command value "iq" is updated in response to the follow-up condition of the actual current "i" with respect to the target current "iO". Therefore, a response time lag caused by mechanical parts is absent, and the command value "iq" can be more accurately and quickly updated in comparison with a conceivable case where a phase advance current is updated in response to the difference between a speed command and a rotational speed. Thus, it is possible to suitably implement the reduction of the electric power consumed by the motor 2 and also the prevention of the heating of the motor 2.

The upper limit "iq(max)" of the phase advance current is determined on the basis of the speed command or the rotational speed derived from the output signal of the encoder 8. Accordingly, it is unnecessary to detect a current inputted into the converter 4 for a current limiting process. Thus, it is unnecessary to provide a detector for sensing the input current. This enables a simple structure of the control apparatus in FIG. 1. Even in the case where the converter 4 also feeds electric power to another motor-driving inverter, the control apparatus in FIG. 1 operates normally.

It is preferable that the current control gain "G" (see FIG. 3) includes an integral term which can approximately cancel an offset between the actual current "i" and the target current "iO". In this case, the follow-up condition of the actual current "i" with respect to the target current "iO" can be accurately determined on the basis of the difference between the actual current "i" and the target current "iO". Accordingly, the current control implemented by the current control circuit 40 is preferably of the PI (proportional integral) type rather than the P (proportional) type.

Second Embodiment

Figure 7:
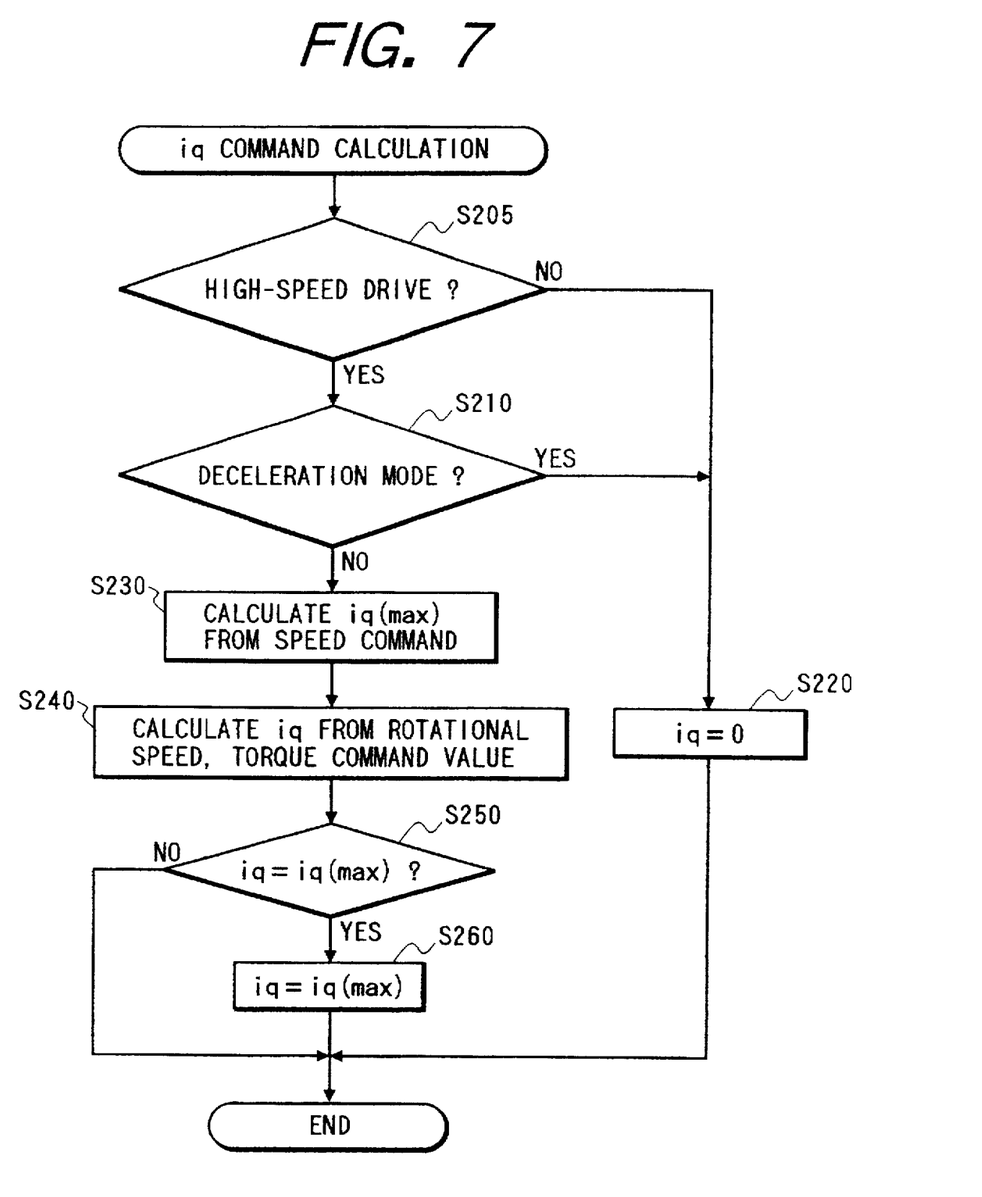
FIG. 7 is a flowchart of a segment of a program related to a control unit in a second embodiment of this invention.

A second embodiment of this invention is similar to the embodiment of FIGS. 1-6 except for design changes indicated hereinafter. FIG. 7 is a flowchart of a segment of a program which relates to an iq calculating section 30 (see FIG. 2) in the second embodiment of this invention. The program segment in FIG. 7 is reiterated at a given control period of, for example, 0.5 msec. together with other calculating processes for drive and control of a brushless DC motor 2 (see FIGS. 1 and 2). In respect of each of motor armature windings of phases "U" and "V", the iq calculating section 30 (see FIG. 2) calculates a command value "iq" of a phase advance current from parameters including a speed command.

As shown in FIG. 7, a first step S205 of the program segment determines whether or not given conditions are currently present in which the motor 2 should be driven at a rotational speed higher than a given rotational speed by referring to the speed command. When the given conditions are not currently present, a phase advance current does not need to be driven through the related motor armature winding so that the program advances from the step S205 to a step S220. The step S220 sets a command value "iq" of a phase advance current to "0". After the step S220, the present execution cycle of the program segment ends.

When the step S205 finds the given conditions to be currently present, the program advances from the step S205 to a step S210. The step S210 derives a condition of a variation in the speed command. By referring to the derived condition of the variation in the speed command, the step S210 determines whether or not the present operation mode of the motor 2 is equal to a decelerating operation mode in which the motor 2 should be decelerated. When the present operation mode of the motor 2 is equal to the decelerating operation mode, the program advances from the step S210 to the step S220. On the other hand, when the present operation mode of the motor 2 is equal to other operation modes, the program advances from the step S210 to a step S230. Examples of the other operation modes are a constant-speed operation mode in which the motor 2 should be operated at a constant speed, and an accelerating operation mode in which the motor 2 should be accelerated. As previously described, the step S220 sets the command value "iq" of the phase advance current to "0". After the step S220, the present execution cycle of the program segment ends. The step S230 calculates an upper limit "iq(max)" of the command value "iq" of the phase advance current on the basis of the speed command. The step S230 may calculate an upper limit "iq(max)" of the command value "iq" of the phase advance current on the basis of the rotational speed derived from the output signal of an encoder 8 (see FIG. 1).

Figure 8:
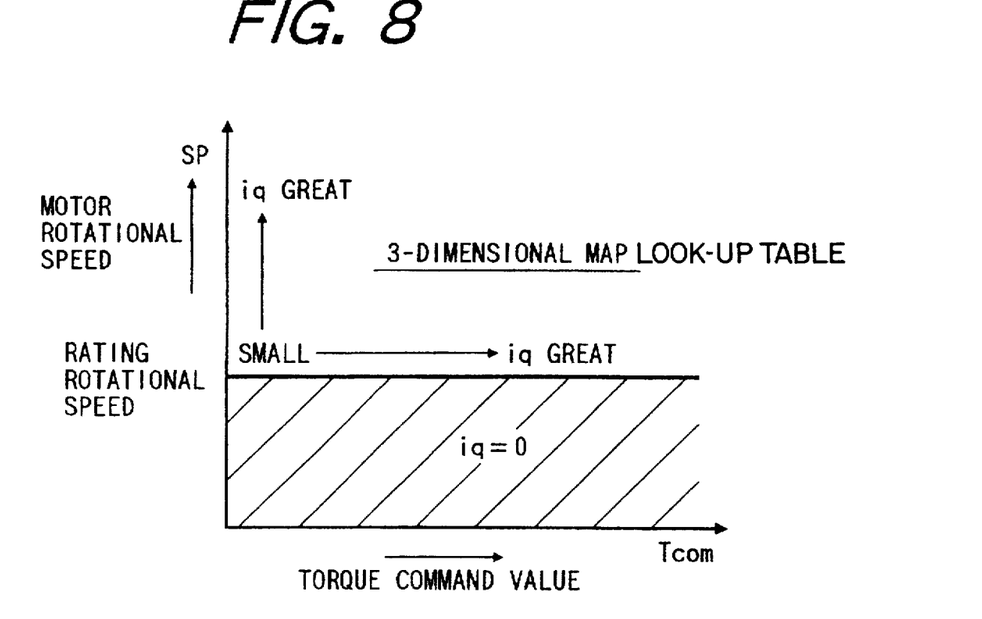
FIG. 8 is a diagram of a look-up table for calculating a command value of a phase advance current from a speed command and a torque command value in the second embodiment of this invention.

A differential processing section 18 (see FIG. 2) calculates the actual rotational speed "SP" of the motor 2. A torque command value calculating section 22 (see FIG. 2) calculates a torque command value "Tcom". A step S240 subsequent to the step S230 calculates the command value "iq" of the phase advance current from the calculated rotational speed "SP" of the motor 2 and the calculated torque command value "Tcom" by referring to a preset three-dimensional map. An example of the three-dimensional map is shown in FIG. 8. The calculated command value "iq" of the phase advance current is designed to generate a torque corresponding to the torque command value "Tcom".

A step S250 subsequent to the step S240 compares the calculated command value "iq" and the calculated upper limit "iq(max)". When the command value "iq" is equal to or smaller than the upper limit "iq(max)", the program exits from the step S250 and then the present execution cycle of the program segment ends. When the command value "iq" is greater than the upper limit "iq(max)", the program advances from the step S250 to a step S260. The step S260 sets the command value "iq" equal to the upper limit "iq(max)". In this way, the command value "iq" is limited to within a range equal to or below the upper limit "iq(max)". After the step S260, the present execution cycle of the program segment ends.

The phase advance current is designed to cancel an induced voltage which occurs across a motor armature winding during high-speed rotation of the motor 2. Accordingly, it is preferable that the phase advance current increases as the rotational speed of the motor 2 increases. In order to limit the phase advance current to small values, it is preferable that the phase advance current increases as the torque command value increases. The use of the three-dimensional look-up table in FIG. 8 is effective in the case where the previously-indicated two preferable conditions are not met simultaneously. The three-dimensional look-up table in FIG. 8 is provided in a ROM within a control unit 10 (see FIG. 1). As previously described, the three-dimensional look-up table in FIG. 8 is used in calculating the command value "iq" of the phase advance current from the motor rotational speed "SP" and the torque command value "Tcom". The three-dimensional look-up table in FIG. 8 is designed so that the command value "iq" will be equal to a small value which enables the motor 2 to be operated at a torque corresponding to the torque command value "Tcom". The upper side of the command value "iq" is limited. Specifically, the command value "iq" is provided with the upper limit "iq(max)". Accordingly, the command value "iq" of the phase advance current and the phase advance current "iq·sin(θ+90)" driven through each of the motor armature windings of the phases "U", "V", and "W" can be limited to small values which enable the motor 2 to be driven in response to the torque command value "Tcom".

The three-dimensional look-up table in FIG. 8 can be set through experiments in which the motor 2 is actually operated, and the lowest value of the phase advance current is determined for each of different rotational speed ranges. The lowest value of the phase advance current is selected out of values in a range where a torque corresponding to the torque command value "Tcom" can be generated.

The use of the three-dimensional look-up table in FIG. 8 may be replaced by the following processes. During actual operation of the motor 2, the generated torque is detected and the phase advance current is varied for each of different rotational speed ranges. Thereby, an experimental determination is made as to the lowest value of the phase advance current which enables the generation of a torque corresponding to the torque command value "Tcom". The relation among these parameters is used in setting an approximate equation for calculating the command value "iq" of the phase advance current from the torque command value "Tcom" and the motor rotational speed "SP". The approximate equation is given as follows.

$$iq = Tcom + SP - a \quad (4)$$

where "a" denotes a constant determined by the experiments. The command value "iq" is calculated by using the approximate equation (4).

The second embodiment of this invention provides advantages similar to those of the embodiment of FIGS. 1–6.

Third Embodiment

A third embodiment of this invention is similar to the embodiment of FIGS. 1–6 or the embodiment of FIGS. 7 and 8 except for design changes indicated hereinafter.

In the third embodiment of this invention, a control unit 10 (see FIG. 1) receives information of actual currents "iU" and "iV" which flow through motor armature windings of phases "U" and "V" respectively. The phase difference between the actual currents "iU" and "iV" is equal to 120°. The control unit 10 converts the information of the actual currents "iU" and "iV" into information of currents "ida" and "iqa" in a d-q coordinate system by coordinate transformation. The phase difference between the currents "ida" and "iqa" is equal to 90°. The control unit 10 calculates control quantities for controlling a torque current and a phase advance current from the difference between the current "ida" and a torque current "id" corresponding to a torque command value, and the difference between the current "iqa" and a command value "iq" of a phase advance current. The calculated control quantities in the d-q coordinate system are converted into corresponding control quantities in a three-phase AC coordinate system. The control unit 10 adjusts an actual current through each of the motor armature windings "U", "V", and "W" in response to the control quantities in the three-phase AC coordinate system. Thereby, a target current "iO" equal to the sum of the torque current "id·sinθ" and the phase advance current "iq·sin(θ+90)" is driven through each of the motor armature windings "U", "V", and "W".

What is claimed is:

1. A control apparatus for a brushless DC motor, comprising:

a) a converter for converting AC electric power to DC electric power;

b) at least one inverter being connected between the converter and an armature winding of the brushless DC motor for generating a drive current from the DC electric power generated by the converter and for supplying the drive current to the armature winding of the brushless DC motor;

c) torque command value calculating means for calculating a torque command value to drive the brushless DC motor in response to a speed command;

d) torque current calculating means for calculating a torque current on the basis of the calculated torque command value, the torque current being driven through the armature winding of the brushless DC motor and being in phase with an electrical angle of the brushless DC motor;

e) phase advance current calculating means for calculating a phase advance current to be driven through the motor armature winding, the phase advance current having a phase advance of 90° with respect to the motor electrical angle; and f) current controlling means for calculating a target current from the calculated torque current and the calculated phase advance current, and for controlling an actual current through the motor armature winding in response to the calculated target current;

wherein the phase advance current calculating means comprises:

e1) upper limit calculating means for calculating an upper limit of the phase advance current on the basis of at least one of the speed command and a rotational speed of the brushless DC motor;

e2) means for detecting the actual current through the motor armature winding which is controlled by the current controlling means;

e3) follow-up condition determining means for determining whether or not the detected actual current through the motor armature winding follows the target current; and e4) phase advance current updating means for, when the follow-up condition determining means determines that the detected actual current through the motor armature winding follows the target current, decreasing the phase advance current within a range having a lower limit equal to zero, and for, when the follow-up condition determining means determines that the detected actual current through the motor armature winding does not follow the target current, increasing the phase advance current within a range having an upper limit equal to the upper limit calculated by the upper limit calculating means.

2. A control apparatus as recited in claim 1, wherein the phase advance current calculating means further comprises:

c5) decelerating operation determining means for determining whether or not the brushless DC motor is to be decelerated on the basis of a variation in one of the speed command and the rotational speed; and c6) calculation inhibiting means for substantially nullifying the phase advance current to inhibit calculation of the phase advance current when the decelerating operation determining means determines that the brushless DC motor is to be decelerated.

3. A control apparatus as recited in claim 1, wherein the phase advance current calculating means further comprises:

c5) high-speed drive determining means for determining whether or not the brushless DC motor is currently driven at a rotational speed higher than a given rotational speed; and c6) means for substantially nullifying the phase advance current when the high-speed drive determining means determines that the brushless DC motor is not currently driven at a rotational speed higher than the given rotational speed.

4. A control apparatus as recited in claim 1, wherein the upper limit calculating means comprises a look-up table for calculating the upper limit, the look-up table having a maximum phase advance current value predetermined with respect to the speed command, and means for calculating the upper limit of the phase advance current by referring to the look-up table.

5. A control apparatus for a brushless DC motor, comprising:

a) a converter for converting AC electric power to DC electric power;

b) at least one inverter being connected between the converter and an armature winding of the brushless DC motor for generating a drive current from the DC electric power generated by the converter and for supplying the drive current to the armature winding of the brushless DC motor;

c) torque command value calculating means for calculating a torque command value to drive the brushless DC motor in response to a speed command;

d) torque current calculating means for calculating a torque current on the basis of the calculated torque command value, the torque current being driven through the armature winding of the brushless DC motor and being in phase with an electrical angle of the brushless DC motor;

e) phase advance current calculating means for calculating a phase advance current to be driven through the motor armature winding, the phase advance current having a phase advance of 90° with respect to the motor electrical angle; and f) current controlling means for calculating a target current from the calculated torque current and the calculated phase advance current, and for controlling an actual current through the motor armature winding in response to the calculated target current;

wherein the phase advance current calculating means comprises:

e1) upper limit calculating means for calculating an upper limit of the phase advance current on the basis of at least one of the speed command and a rotational speed of the brushless DC motor;

e2) current value calculating means for increasing the phase advance current as said one of the speed command and the rotational speed increases and the torque command value increases; and e3) means for outputting smaller one of the upper limit calculated by the upper limit calculating means and the phase advance current provided by the current value calculating means to the current controlling means as the phase advance current used by the current controlling means.

6. A control apparatus as recited in claim 2, wherein the phase advance current calculating means further comprises:

c4) decelerating operation determining means for determine whether or not the brushless DC motor is to be decelerated on the basis of a variation in one of the speed command and the rotational speed; and c5) calculation inhibiting means for substantially nullifying the phase advance current to inhibit calculation of the phase advance current when the decelerating operation determining means determines that the brushless DC motor is to be decelerated.

* * * * *